(12) United States Patent
Khubani et al.

(10) Patent No.: US 9,562,673 B1
(45) Date of Patent: *Feb. 7, 2017

(54) DECORATIVE LIGHTING APPARATUS HAVING AN ATTENUATION ASSEMBLY

(71) Applicant: Telebrands Corp., Fairfield, NJ (US)

(72) Inventors: Ajit Khubani, Saddle River, NH (US); Yun Pan, Shenzen (CN)

(73) Assignee: Telebrands Corp., Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/958,667

(22) Filed: Dec. 3, 2015

(51) Int. Cl.
| F21V 1/00 | (2006.01) |
| F21V 17/12 | (2006.01) |
| F21V 23/04 | (2006.01) |
| F21W 121/00 | (2006.01) |

(52) U.S. Cl.
CPC .............. *F21V 17/12* (2013.01); *F21V 23/04* (2013.01); *F21W 2121/00* (2013.01)

(58) Field of Classification Search
CPC ....... F21V 17/12; F21V 23/04; F21W 2121/00
USPC ......................................................... 362/240
See application file for complete search history.

(56) References Cited

U.S. PATENT DOCUMENTS

| 3,104,064 A | 9/1963 | Bellek |
| D231,559 S | 4/1974 | Darling |
| D233,778 S | 11/1974 | Kennedy |
| D233,779 S | 11/1974 | Kennedy |
| D234,710 S | 4/1975 | Beeren |
| 4,114,112 A | 9/1978 | Epstein |
| 4,307,528 A | 12/1981 | Dewees |
| 4,458,124 A | 7/1984 | Kroth |
| D278,215 S | 4/1985 | Patterson |
| 4,557,055 A | 12/1985 | Arai |
| D282,104 S | 1/1986 | Taylor |
| 4,779,176 A | 10/1988 | Bornhorst |
| 4,814,961 A | 3/1989 | O'Brien |

(Continued)

FOREIGN PATENT DOCUMENTS

| CN | 204141534 | 2/2015 |
| CN | 204141534 U | 2/2015 |

(Continued)

OTHER PUBLICATIONS

Laser Light, available at www.amazon.com, accessed on Nov. 13, 2015.

(Continued)

*Primary Examiner* — Anh Mai
*Assistant Examiner* — Hana Featherly
(74) *Attorney, Agent, or Firm* — Cooper & Dunham, LLP (57) ABSTRACT

A decorative lighting apparatus including at least one light source and an attenuation assembly. The attenuation assembly including an attenuator, a first housing being configured to be coupled to a second housing, and a first base being configured to be coupled to a second base. When the first housing is coupled to the second housing, the first and second housings form a recess designed and dimensioned to receive and hold the attenuator in a substantially fixed position, and when the first base is coupled to the second base, the first and second bases form a further recess designed and dimensioned to receive and hold the coupled first housing and second housing in a substantially fixed position.

16 Claims, 8 Drawing Sheets

(56) References Cited

U.S. PATENT DOCUMENTS

| | | |
|---|---|---|
| 5,036,447 A | 7/1991 | Taylor |
| D323,406 S | 1/1992 | Fisher |
| 5,086,379 A | 2/1992 | Denison |
| D328,147 S | 7/1992 | Gecchelin |
| D333,526 S | 2/1993 | Taylor |
| D333,529 S | 2/1993 | Denison |
| 5,280,417 A | 1/1994 | Hall |
| 5,367,349 A | 11/1994 | Zeiler |
| 5,398,180 A | 3/1995 | Lee |
| 5,459,539 A | 10/1995 | Yamamoto |
| D365,169 S | 12/1995 | Fillipp |
| D370,070 S | 5/1996 | Kay |
| 5,613,799 A | 3/1997 | Guide |
| 5,626,418 A | 5/1997 | Angelis |
| D414,579 S | 9/1999 | Denison |
| 5,971,545 A | 10/1999 | Haitz |
| 6,000,813 A | 12/1999 | Krietzman |
| 6,145,228 A | 11/2000 | LaChance |
| D437,071 S | 1/2001 | Andrus |
| D438,999 S | 3/2001 | Bossy |
| 6,304,237 B1 | 10/2001 | Karakawa |
| D482,476 S | 11/2003 | Kwong |
| 6,722,771 B1 | 4/2004 | Stephens |
| 6,874,893 B2 | 4/2005 | Park |
| D506,282 S | 6/2005 | Benghozi |
| D506,283 S | 6/2005 | Benghozi |
| D541,966 S | 5/2007 | Benghozi |
| D550,877 S | 9/2007 | Mullen |
| D551,789 S | 9/2007 | Mullen |
| 7,369,584 B2 | 5/2008 | Goldman |
| D574,532 S | 8/2008 | Lee |
| D577,453 S | 9/2008 | Metlen |
| D589,191 S | 3/2009 | Sabernig |
| D604,882 S | 11/2009 | Mier-Langner |
| RE41,050 E | 12/2009 | Panasewicz |
| D605,325 S | 12/2009 | Sanoner |
| 7,641,345 B2 | 1/2010 | Johnson |
| D616,586 S | 5/2010 | Sabernig |
| D619,289 S | 7/2010 | You |
| D619,290 S | 7/2010 | You |
| D625,871 S | 10/2010 | Huang |
| 7,832,918 B2 | 11/2010 | Chien |
| D632,414 S | 2/2011 | Croce |
| 8,003,886 B1 | 8/2011 | Rintz |
| D649,671 S | 11/2011 | Ferro |
| 8,057,045 B2 | 11/2011 | Johnson |
| 8,100,537 B2 | 1/2012 | Johnson |
| 8,100,538 B2 | 1/2012 | Kuroda |
| D659,871 S | 5/2012 | Lee |
| D667,981 S | 9/2012 | Connolly |
| 8,297,825 B2 | 10/2012 | Onishi |
| 8,303,129 B1 | 11/2012 | Thielen |
| 8,366,292 B2 | 2/2013 | McDermott |
| 8,376,574 B2 | 2/2013 | Spartano |
| 8,436,553 B2 | 5/2013 | Zampini |
| 8,480,233 B2 | 7/2013 | Smith |
| 8,693,513 B2 | 4/2014 | Achtenhagen |
| 8,721,160 B2 | 5/2014 | Chien |
| D723,726 S | 3/2015 | Reed |
| D738,023 S | 9/2015 | Rosello Gratacos |
| 2002/0101571 A1 | 8/2002 | Panasewicz |
| 2003/0189825 A1 | 10/2003 | Tauch |
| 2004/0119951 A1 | 6/2004 | Vitantonio |
| 2005/0024863 A1 | 2/2005 | Phipps |
| 2006/0158138 A1 | 7/2006 | Walter |
| 2006/0198153 A1 | 9/2006 | Chien |
| 2007/0064290 A1 | 3/2007 | Hochenbleicher |
| 2008/0316732 A1 | 12/2008 | Blake |
| 2009/0122564 A1 | 5/2009 | Beadle |
| 2009/0168026 A1 | 7/2009 | Chen |
| 2010/0053969 A1 | 3/2010 | Weinheimer |
| 2014/0036487 A1 | 8/2012 | Adams |
| 2013/0088152 A1 | 4/2013 | Hagen |
| 2013/0088723 A1* | 4/2013 | Feldkhun ........... G01B 9/02082 356/498 |
| 2013/0257297 A1 | 10/2013 | Schmidt |
| 2015/0035437 A1 | 2/2015 | Panopoulos |
| 2015/0159842 A1 | 6/2015 | Zhang |
| 2015/0260385 A1 | 9/2015 | Brynjolfsson |

FOREIGN PATENT DOCUMENTS

| | | |
|---|---|---|
| CN | 303234579 S | 6/2015 |
| CN | 204629169 U | 9/2015 |
| EP | 1 024 399 | 2/2000 |
| WO | WO 2015/094009 | 6/2015 |
| WO | WO 2015/143450 | 9/2015 |
| WO | WO 2015/149877 | 10/2015 |

OTHER PUBLICATIONS

Night Stars, available at www.amazon.com, accessed Nov. 13, 2015.
Poeland Garden Laser Landscape, available at www.amazon.com, accessed Nov. 13, 2015.
Remote Controllable RGB Laser, available at www.amazon.com, accessed Nov. 13, 2015.
Newest Garden Tree and Outdoor Wall Decoration Laser, available at www.amazon.com, accessed Nov. 13, 2015.
Pepnice Red and Green Firefly Laser Light, available at www.amazon.com, accessed Nov. 13, 2015.
KLAREN Color Laser Light Projector, available at www.amazon.com, accessed Nov. 13, 2015.
Garden Tree and Outdoor Wall Decoration Laser Lights for Holiday Lighting, available at www.amazon.com, accessed Nov. 13, 2015.
Green and Red Light Garden Tree and Outdoor Wall Decoration Laser Lights, available at www.amazon.com, accessed Nov. 13, 2015.
Moving Red and Green 2 Color Laser Landscape Projector Light w/ Remote, available at www.amazon.com, accessed Nov. 13, 2015.
SeresRoad Outdoor Waterproof Star Projector, Landscape Projector, available at www.amazon.com, accessed on Nov. 13, 2015.
Us-vision AGO-20RG Modern Outdoor/Indoor 20 Patterns Gobos Rg Laser Projector, available at www.amazon.com, accessed Nov. 13, 2015.
Sminiker Outdoor Laser Light Sparkle Magic Lights Landscape Light Holiday Light, available at www.amazon.com, accessed Nov. 13, 2015.
Us-vision Outdoor Holiday Waterproof Green Laser Lighting Show, available at www.amazon.com, accessed Nov. 13, 2015.
Improvements All-metal 4-in-1 Projection Light with Remote, available at www.amazon.com, accessed Nov. 13, 2015.
KLAREN Color Laser Light Projector—Improvements, available at www.amazon.com, accessed Nov. 13, 2015.
Light Flurries, available at www.lightflurries.com, accessed Mar. 17, 2016.
International Search Report PCT/US2016/021354, published Jun. 30, 2016.
Written Opinion of International Search Authority PCT/US2016/021354, published Jun. 30, 2016.
Mr. Christmas Super Green Laser Light Show, available at www.amazon.com, accessed May 2, 2016.
BlissLights Motion Laser, available at www.amazon.com, accessed May 2, 2016.
Color Laser Lights Instructions, published 2014.
BlissLights Spright Smart User Guide, published 2014.
Blisslights Spright Spring Smart Outdoor Indoor Firefly Light Projector with Timer, available at www.amazon.com, accessed May 2, 2016.
Outdoor Indoor Spright Smart Firefly Light with Timer Green, available at www.amazon.com, accessed May 2, 2016.
International Search Report PCT/US2016/021347, published May 17, 2016.
Written Opinion of International Search Authority PCT/US2016/021347, published May 17, 2016.
International Search Report PCT/US2016/021338, published May 16, 2016.

(56) References Cited

OTHER PUBLICATIONS

Written Opinion of International Search Authority PCT/US2016/021338, published May 16, 2016.
Examination Report of Application No. 2016101293 by IP Australia, issued Oct. 20, 2016.
Laser Christmas Lights & Outdoor Laser Lights, published Oct. 6, 2015, available at http://web.archive.org/web/20151006140058/http://www.laserchristmaslights.com.
Examination Report of Application No. 2016101295 by IP Australia, issued Oct. 20, 2016.

* cited by examiner

DECORATIVE LIGHTING APPARATUS HAVING AN ATTENUATION ASSEMBLY

FIELD

The present invention generally relates to a decorative lighting apparatus. Specifically, embodiments of the present invention relate to a decorative laser light apparatus.

BACKGROUND

Lighting is often used in a decorative manner. For example, many people decorate homes, offices, stores, outdoor spaces, etc. with various lighting to achieve certain effects, designs, atmospheres, festive moods, etc. Although decorative lighting may be used at any time of the year, many people utilize decorative lighting during certain holidays.

There are many types of decorative lighting. For example, string lights, character lights, and laser lights are just a few of the various forms of decorative lighting. However, existing laser lights having numerous shortcomings in their design and functionality. For example, switch mechanisms used to control the operation of many laser lights are typically limited in their functionality and are often disposed in inconvenient locations. This can make accessing the switch and operating the decorative light difficult, especially when the light is positioned for use. Additionally, although the lasers used in the decorative lights can be dangerous, many decorative laser lights use unreliable adhesives and tapes that a prone to failure to affix lenses that scatter the light emitted by lasers.

SUMMARY

Embodiments of the present invention can provide an attenuation assembly for a decorative lighting apparatus. The attenuation assembly can include an attenuator, a first housing being configured to be coupled to a second housing, and a first base being configured to be coupled to a second base. When the first housing is coupled to the second housing, the first and second housings form a recess designed and dimensioned to receive and hold the attenuator in a substantially fixed position, and when the first base is coupled to the second base, the first and second bases form a further recess designed and dimensioned to receive and hold the coupled first housing and second housing in a substantially fixed position.

According to certain embodiments, the attenuation assembly can further include at least one fastening element configured to couple the first base to the second base. The at least one fastening element can be further configured to couple the attenuation assembly to the decorative lighting apparatus. The at least one fastening element can include screws.

According to certain embodiments, the attenuation assembly can include a plurality of attenuators. Accordingly, the attenuation assembly can include a plurality of first housings configured to be coupled to a plurality of second housings, and where the further recess includes a plurality of further recesses, with each further recess designed and dimensioned to receive and hold one of the plurality of first housings and second housings, which have been coupled, in a substantially fixed position. Further, the attenuation assembly can be configured to position the attenuator in a path of a light generated by the decorative lighting apparatus.

According to certain embodiments, the present invention can provide a decorative lighting apparatus can include at least one light source and an attenuation assembly. The attenuation assembly can include an attenuator, a first housing being configured to be coupled to a second housing and a first base being configured to be coupled to a second base. When the first housing is coupled to the second housing, the first and second housings form a recess designed and dimensioned to receive and hold the attenuator in a substantially fixed position, and when the first base is coupled to the second base, the first and second bases form a further recess designed and dimensioned to receive and hold the coupled first housing and second housing in a substantially fixed position.

According to certain embodiments, the at least one light source can include a laser. Additionally, the attenuator assembly can further include at least one fastening element configured to couple the first base to the second base, and can be further configured to couple the attenuation assembly to the decorative lighting apparatus. According to certain embodiments, the attenuation assembly can be configured to position the attenuator in a path of a light generated by the decorative lighting apparatus.

According to certain embodiments, the present invention can provide a laser light decorative lighting apparatus including a first laser light source providing a first light having a first color, a second laser light source providing a second light having a second color, a rocker switch including a first position corresponding to the first light source and the second light source being in an off condition, a second position corresponding to the first light source being in an on condition and the second light source being in an off condition, and a third position corresponding to the first light source and the second light source being in an on condition, a visual indicator including a first colored portion corresponding to the first color and corresponding to the second position of the rocker switch and a second colored portion corresponding to the first color and the second color and corresponding to the third position of the rocker switch, and an attenuation assembly. The attenuation assembly can include an attenuator, a first housing being configured to be coupled to a second housing, a first base being configured to be coupled to a second base. When the first housing is coupled to the second housing, the first and second housings form a recess designed and dimensioned to receive and hold the attenuator in a substantially fixed position, and when the first base is coupled to the second base, the first and second bases form a further recess designed and dimensioned to receive and hold the coupled first housing and second housing in a substantially fixed position, such that at least one of the first light and the second light travels through the attenuator.

According to certain embodiments, the laser light decorative lighting apparatus can further include a motion switch for controlling a movement of the first light and second light projected by the first laser light source and the second laser light source.

According to certain embodiments, the laser light decorative lighting apparatus can further include a light sensor configured to measure a level ambient of light and control the first laser light source and the second laser light source based on the measured level of ambient light.

BRIEF DESCRIPTION OF THE DRAWINGS

The features and advantages of the present invention can be more readily understood from the following detailed description with reference to the accompanying drawings, wherein.

DETAILED DESCRIPTION

Embodiments of the present invention generally relate to a decorative lighting apparatus. Specifically, certain exemplary embodiments of the present invention provide various new and novel features for a decorative lighting apparatus, such as a decorative laser lighting apparatus. Although the embodiments of the present invention are primarily described with respect to a decorative laser lighting apparatus, it is not limited thereto, and it should be noted that the exemplary apparatus and systems described herein may be used in connection with any decorative lighting apparatus.

Figure 1:
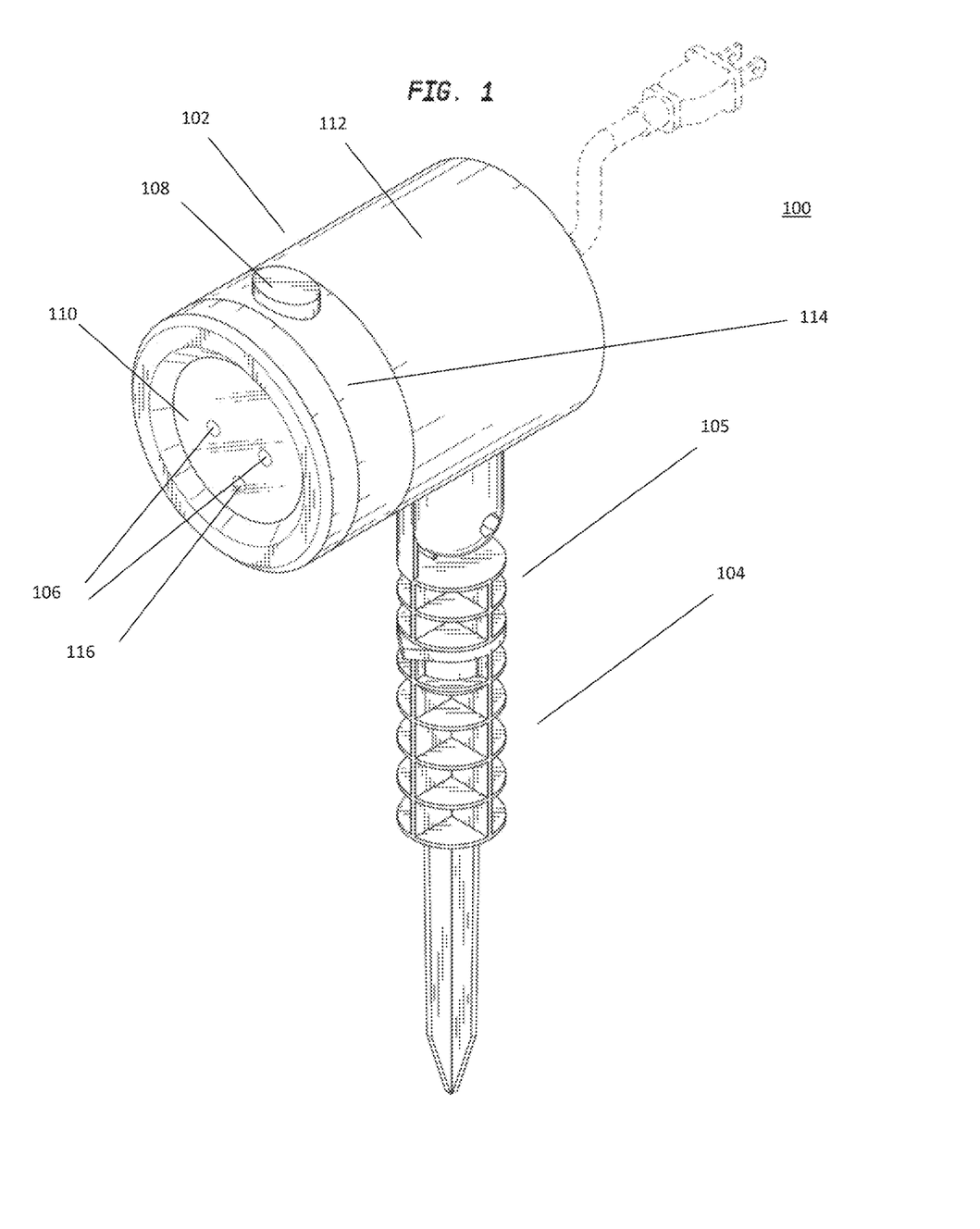
FIG. 1 is a front perspective of an exemplary decorative lighting apparatus according to one embodiment of the present invention.

In accordance with embodiments of the present invention, FIG. 1 shows a perspective view of an exemplary decorative lighting apparatus 100. As shown in FIG. 1, decorative lighting apparatus 100 may include body 102, mounting element 104, one or more light sources 106, switch 108, and light sensor 116. According to one embodiment, in operation, decorative lighting apparatus 100 is positioned via mounting element 104 and is coupled to a power source. A user can then actuate switch 108 to control the operation of decorative lighting apparatus 100. When decorative lighting apparatus 100 is turned on via switch 108, light sources 106 are activated to produce light, and decorative lighting apparatus 100 thereby emits and projects the light generated by light sources 106 onto a target, such as a wall of a house or other structure. According to certain embodiments of the present invention, the light generated by light sources 106 passes through a light attenuator to attenuate the light being emitted and projected by decorative lighting apparatus 100.

According to embodiments of the present invention, decorative lighting apparatus 100 can generate any combination of colored light depending on the light source(s) 106 employed by decorative lighting apparatus 100. For example, light source(s) 106 may include one or more light sources all producing the same color light (e.g., green) so that decorative lighting apparatus 100 only emits and projects one color light. Alternatively, light source(s) 106 may include multiple light sources capable of producing lights of various colors so that decorative lighting apparatus 100 can generate multiple different colored lights (e.g., red light and green light). Although the embodiments of the present invention are primarily described with respect to a decorative laser lighting apparatus generating two different colored lights (i.e., red light and green light), it is not limited thereto, and it should be noted that the exemplary apparatus and systems described herein may generate any combination of any number of different colored lights.

Figure 5:
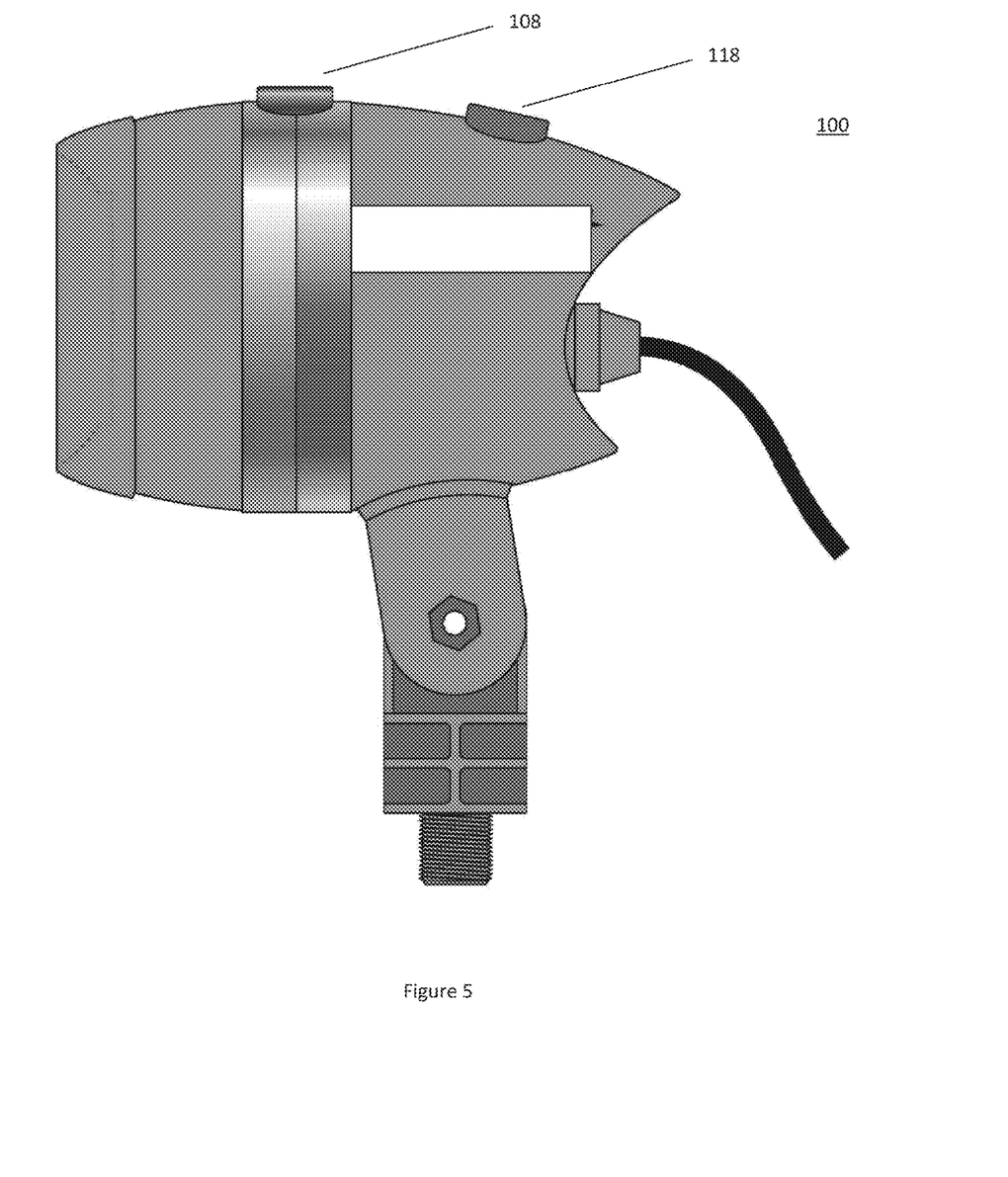
FIG. 5 is a side view of an exemplary decorative lighting apparatus according to one embodiment of the present invention.

As shown in FIG. 1, body 102 may be cylindrical in shape and preferably houses the mechanical and electrical components of decorative lighting apparatus 100. For example, body 102 may include housing 112, light source(s) 106, light cover 110, switch 108, switch visual indicator 114, and light sensor 116. Inside housing 112, body 102 may house electronic circuitry (not shown) that enables the electrical operation of decorative lighting apparatus 100, as well as various mechanical components (not shown) that facilitate the design and operation of decorative lighting apparatus 100. According to certain embodiments of the present invention, as shown in FIG. 5, decorative lighting apparatus 100 may also include a motion switch 118 to control a motion, modulation, or articulation of light source(s) 106.

Figure 2:
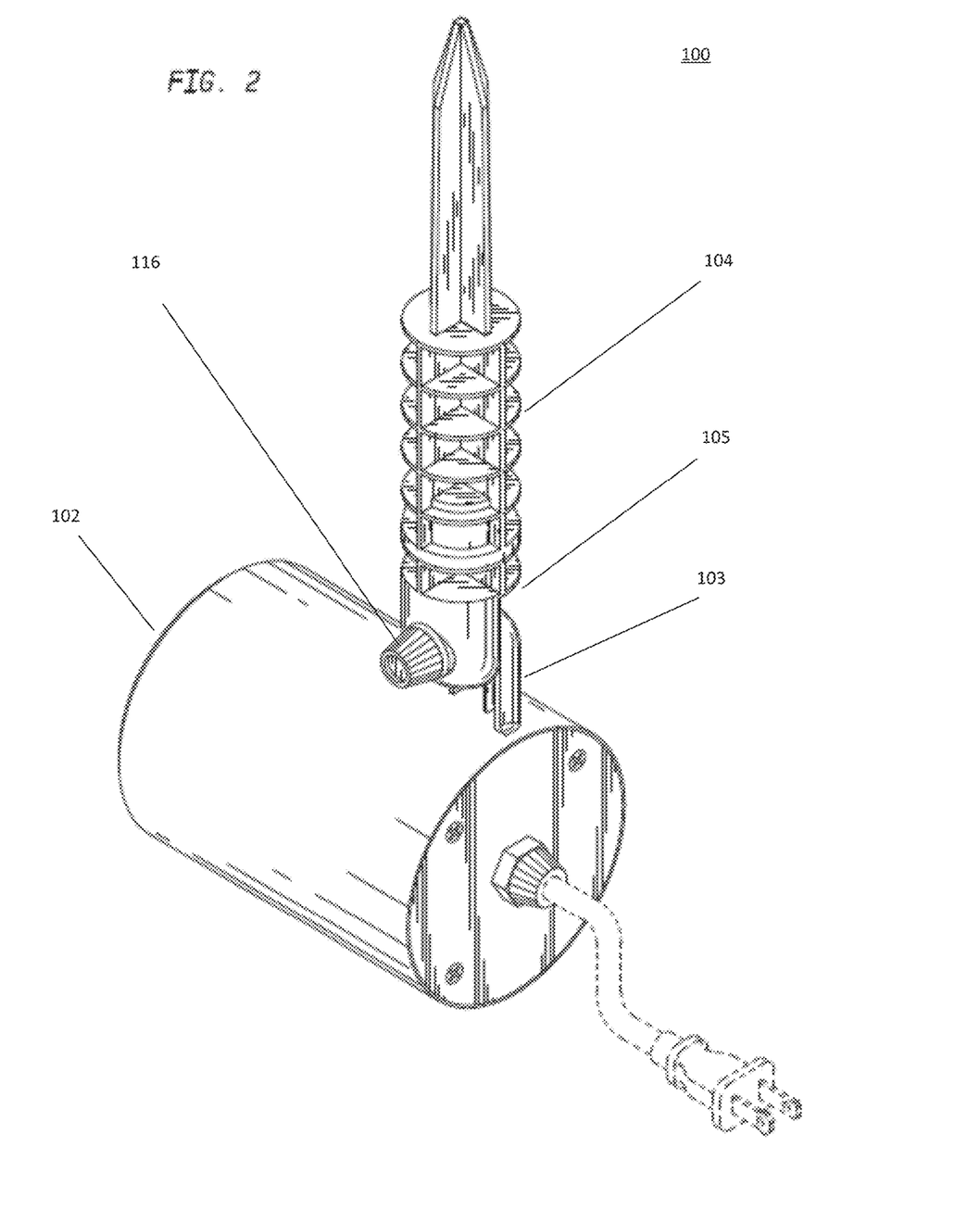
FIG. 2 is a rear perspective of an exemplary decorative lighting apparatus according to one embodiment of the present invention.

As shown in FIGS. 1 and 2, body 102 may be coupled to pivoting arm 105 via a coupling element 116. According to certain embodiments of the present invention, coupling element 116 may include a nut and a hand screw, as shown in FIG. 2. For example, projection 103 of body 102 may include a nut disposed within a recess which may prevent the nut from rotating, and pivoting arm 105 may include an opening through which the hand screw may pass. To secure pivoting arm 105 to body 102, the hand screw can pass through the opening in pivoting arm 105 and engage the nut disposed in projection 103 of body 102. Further, coupling element 116 may also allow body 102 to be rotatably adjusted relative to pivoting arm 105. For example, the surfaces of projection 103 and pivoting arm 105 which contact each other may be toothed or geared so that body 102 can be rotatably adjusted relative to pivoting arm 105 in discrete positions. Alternatively, the contacting surfaces can be smooth such that body 102 can be rotatably adjusted relative to pivoting arm 105 through a full range of motion. In operation, when the hand screw and the nut of coupling element 116 are not fully tightened, body 102 can be rotatably adjusted relative to pivoting arm 105 so that the angle at which the light is projected can be adjusted. After body 102 is positioned in a desired angle relative to pivoting arm 105, the hand screw of coupling element 116 can be tightened so that body 102 is substantially fixed relative to pivoting arm 105. Although coupling element 116 is shown as a screw and a nut, coupling element 116 can include any mechanism by which the angle of body 102 can be adjusted and fixed relative to pivoting arm 105, such as a hinge, or the like. According to certain embodiments of the present invention, body 102 is rotatably adjustable relative to pivoting arm 105 via a single pivoting point.

As shown in FIGS. 1 and 2, to facilitate positioning of decorative lighting apparatus 100 in a desired location and position, mounting element 104 is coupled to pivoting arm 105. According to certain embodiments, mounting element 104 and pivoting arm 105 can include complementary threads configured to engage each other to couple mounting element 104 and pivoting arm 105, allowing mounting element 104 and pivoting arm 105 to be screwed together. Alternatively, mounting element 104 and pivoting arm 105 can be coupled via any coupling engagement, such as a locking nut, an engaging projection and recess, etc. As shown in FIG. 1, according to certain embodiments of the present invention, mounting element 104 may include a ground stake. This can enable decorative lighting apparatus 100 to be positioned outside by positioning and securing decorative lighting apparatus 100 in a material such as soil, grass, dirt, etc. by inserting the mounting element 104 into such material. Although mounting element 104 is shown as a ground stake in FIG. 1, alternatively, mounting element 104 can be any mechanism that facilitates positioning decorative lighting apparatus 100. For example, mounting element 104 may include a bracket, a clip, a platform, or any other mechanism by which decorative lighting apparatus 100 may be located and/or positioned in a desired location.

As noted above, the operation of decorative lighting apparatus 100 can be controlled using switch 108. Although switch 108 is shown as a button, switch 108 can be any type of switch that can control the operation of decorative lighting apparatus 100, such as, e.g., a rocker switch, a toggle switch, a dimmer switch, a rotating switch, and the like. Preferably, switch 108 is disposed on a top portion of body 102 to facilitate easy access to the switch by a user. For example, if decorative lighting apparatus 100 is placed outdoors in a discreet location, such as behind bushes or some other structure, locating switch 108 on a top portion of body 102 enables a user to easily access switch 108 and operate decorative lighting apparatus 100. According to one embodiment, switch 108 may include weather-proofing elements to protect switch 108, as well as other internal components of decorative lighting apparatus 100, from the exterior environment, including weather. For example, weather-proofing elements for switch 108 may include rubber, plastic, and/or other sealing elements to make it substantially waterproof, water-repellant, dirt-proof, and the like. According to one embodiment, waterproofing switch 108 may include a rubber or plastic cover with an extension that is disposed over switch 108 and sealed on an interior surface of housing 112. For example, this plastic cover may be shaped similarly to a top-hat.

Figure 3A:
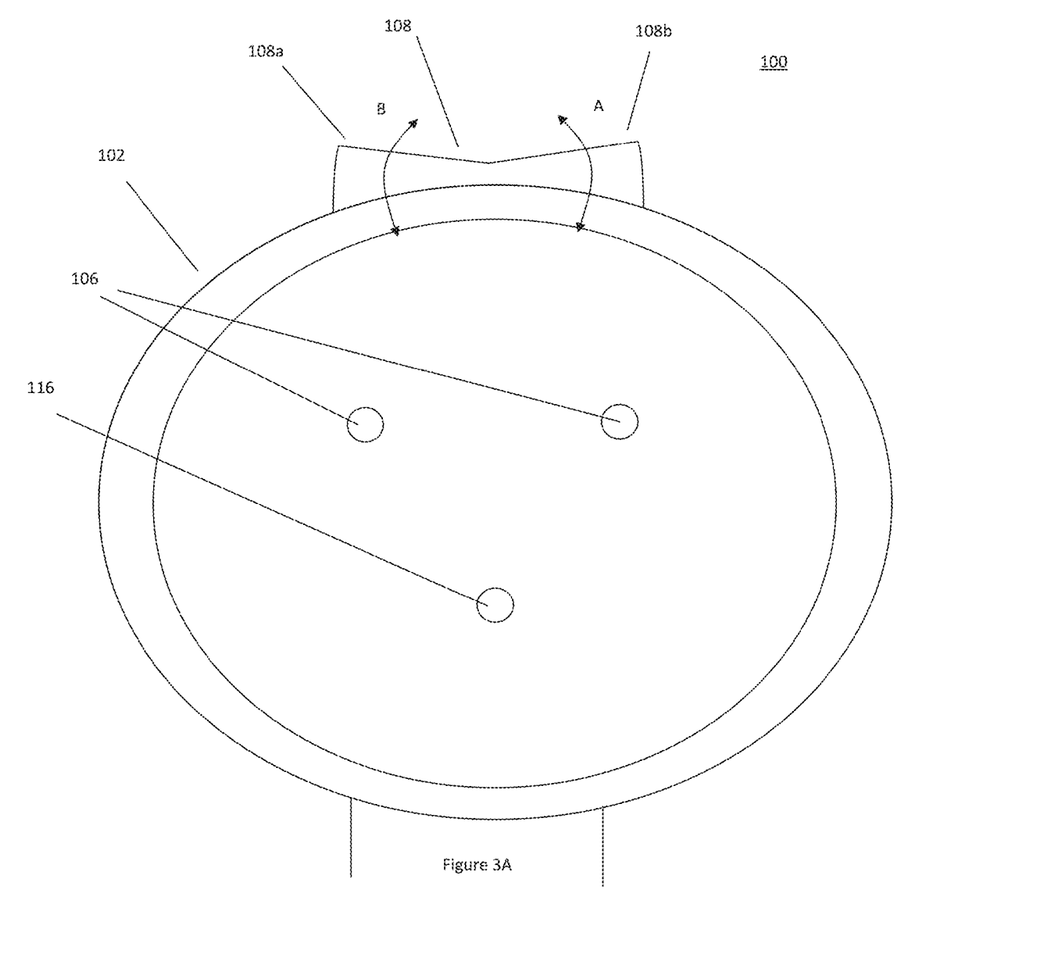
FIG. 3A is a front view of an exemplary decorative lighting apparatus according to one embodiment of the present invention.
Figure 3B:
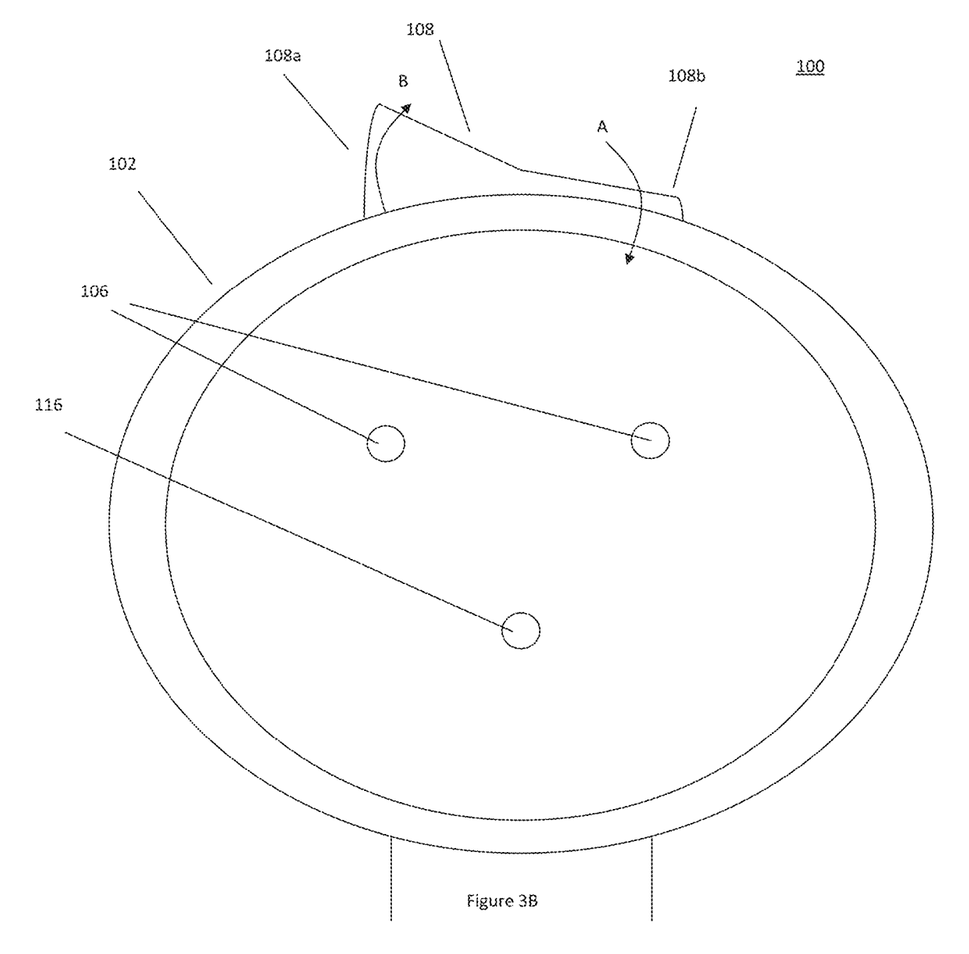
FIG. 3B is a front view of an exemplary decorative lighting apparatus according to one embodiment of the present invention.
Figure 3C:
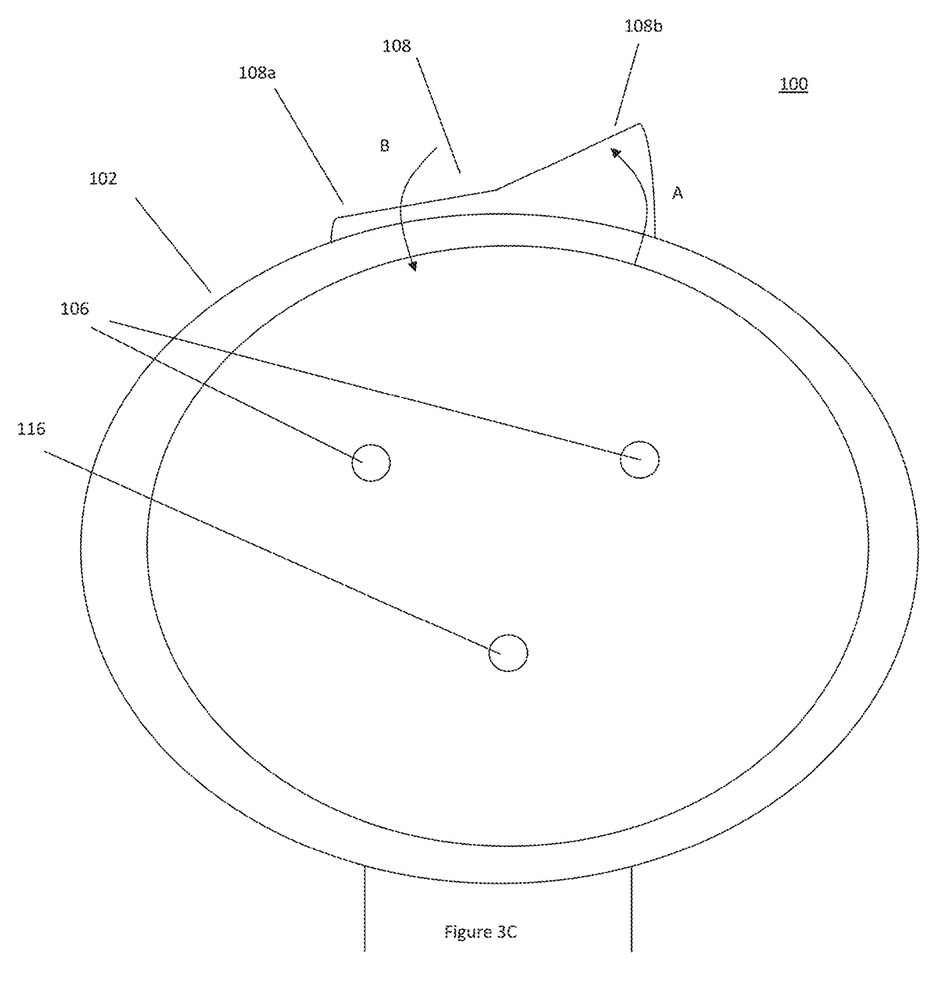
FIG. 3C is a front view of an exemplary decorative lighting apparatus according to one embodiment of the present invention.

As shown in FIG. 3A, according to certain embodiments of the present invention, switch 108 may include a rocker switch having switch portions 108a and 108b. As shown in FIGS. 3A, 3B, and 3C, switch 108 may include three positions and may be articulated between the various positions by pressing on switch portion 108a or 108b to articulate the switch in the directions depicted by arrows A and B.

According to certain embodiments of the present invention, FIG. 3A shows switch 108 in an OFF position. In this OFF position, neither switch portion 108a nor 108b is depressed, and light sources 106 are in an off condition (i.e., not generating light) and decorative lighting apparatus 100 is therefore not emitting or projecting any light. In the OFF position, either switch portion 108a or 108b can be pressed in the directions depicted by arrows A and B, respectively, to articulate switch 108 into one of two ON positions.

FIG. 3B shows switch 108 in a first ON position. In the position shown in FIG. 3B, switch 108 may have been articulated from the OFF position shown in FIG. 3A in the direction shown by the arrows. Specifically, the movement of switch portion 108b is shown by arrow A and the movement of switch portion 108a is shown by arrow B. For example, from the OFF position shown in FIG. 3A, switch portion 108b may have been pressed to articulate switch 108 from the OFF position to this first ON position as shown in FIG. 3B. According to certain embodiments of the present disclosure, in this first ON position, decorative lighting apparatus 100 may be operating in a first operating mode. For example, in an embodiment where light sources 106 produce red light and green light, this first ON position of switch 108 may correspond to an operation of decorative lighting apparatus 100 where light sources 106 producing both red light and green light are turned on so that decorative lighting apparatus 100 emits and projects both red light and green light.

FIG. 3C shows switch 108 in a second ON position. In the position shown in FIG. 3C, switch 108 may have been articulated from the OFF position in the direction shown by the arrows. Specifically, the movement of switch portion 108b is shown by arrow A and the movement of switch portion 108a is shown by arrow B. For example, from the OFF position shown in FIG. 3A, switch portion 108a may have been pressed to articulate switch 108 from the OFF position to this second ON position as shown in FIG. 3C. According to certain embodiments of the present disclosure, in this second ON position, decorative lighting apparatus 100 may be operating in a second operating mode. For example, in an embodiment where light sources 106 produce red light and green light, this second ON position of switch 108 may correspond to an operation of decorative lighting apparatus 100 where only the light sources 106 which only produce green light are turned on so that decorative lighting apparatus 100 emits and projects only green light.

Figure 4:
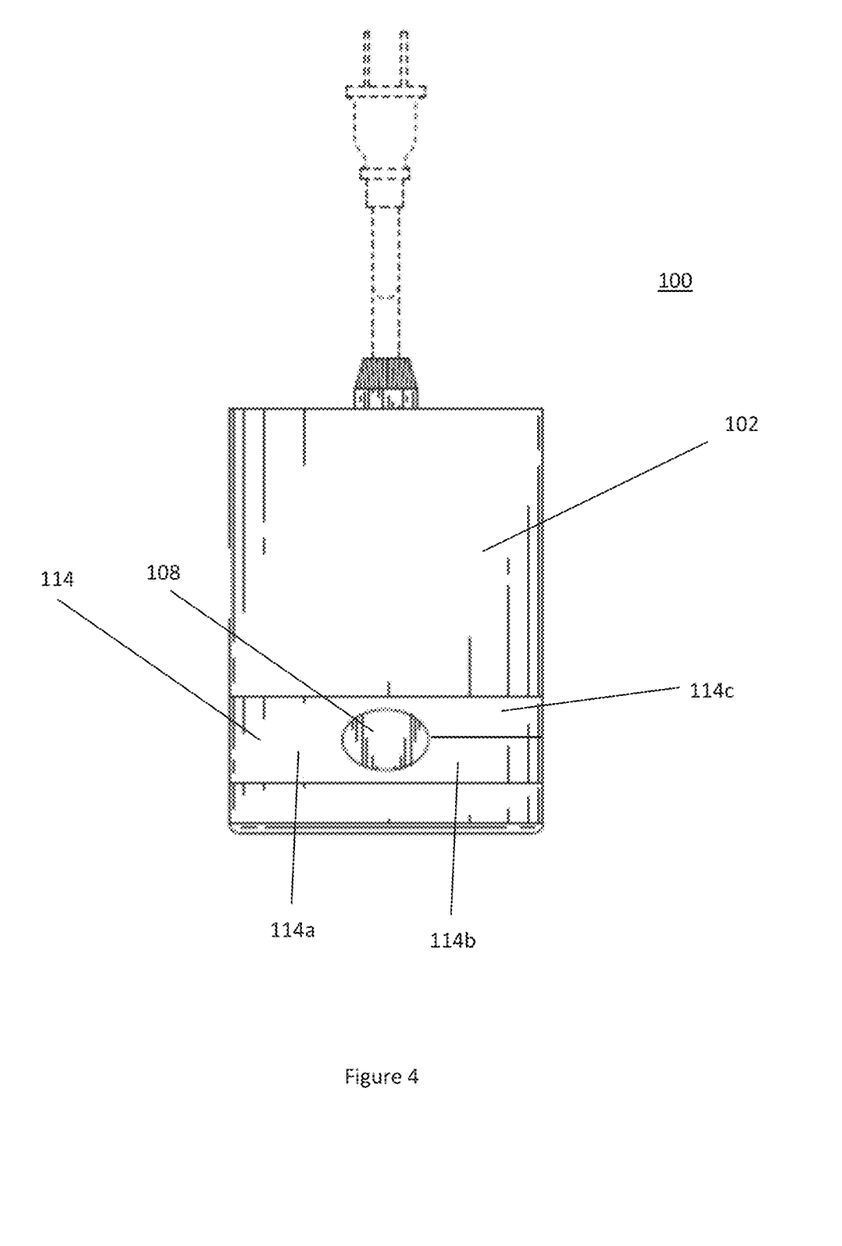
FIG. 4 is a top view of an exemplary decorative lighting apparatus according to one embodiment of the present invention.

FIG. 4 shows a top view of decorative lighting apparatus 100, including a view of body 102, switch 108, and switch visual indicator 114. As shown in FIG. 4, according to certain embodiments of the present invention, switch visual indicator 114 may include portions 114a, 114b, and 114c. Portions 114a, 114b, and 114c can include visual indicators that correlate the position of switch 108 to the operating modes of decorative lighting apparatus 100. For example, portion 114b may include a green color and portion 114c may include a red color. These colors may correspond to the first operating mode described with respect to FIG. 3B, where decorative lighting apparatus 100 emits and projects both green light and red light. Accordingly, articulating switch 108 toward the side of visual indicator 114 which includes green portion 114b and red portion 114c can activate the light sources 106 which produce green light and red light. Thus, articulating switch 108 in this direction would turn decorative lighting apparatus 100 on to emit and project both red light and green light. Further, portion 114a may include only a green portion and may correspond to the second operating mode of decorative lighting apparatus 100 described above with respect to FIG. 3C. Similarly, articulating switch 108 towards the side of visual indicator 114 which only includes green portion 114a can activate only the light sources 106 which produce green light, thereby activating decorative lighting apparatus 100 to emit and project only green light.

Light sensor 116 can also control the operation of decorative lighting apparatus 100 in conjunction with switch 108. According to certain embodiments of the present invention, light sensor 116 measures the ambient light present and can control whether light sources 106 are on or off. For example, assuming that switch 108 is in one of the two operating modes described above, light sensor may turn the appropriate light sources 106 on or off depending on the level of ambient light measured by light sensor 116. During the day, when light sensor 116 measures a level ambient light above a certain predetermined threshold, light sensor 116 may turn light sources 106 off, regardless of the position of switch 108. When the level of ambient light measured by light sensor 116 drops below the predetermined threshold (e.g., as it becomes night), light sensors 116 may allow light sources 106 to operate as dictated by switch 108. Accordingly, the operation of light sensor 116 can extend the lifetime of decorative lighting apparatus 100, prevent overheating of decorative lighting apparatus 100, and provide energy savings by ensuring that decorative lighting apparatus 100 is not operating continuously during high levels of ambient light when the light emitted and projected by decorative lighting apparatus 100 may be difficult to see in any event.

As shown in FIG. 5, according to certain embodiments of the present invention, decorative lighting apparatus 100 may also include a motion switch 118. Similar to switch 108, motion switch 118 may also be disposed on a top portion of body 102 to enable a user to easily access switch 118, especially while decorative lighting apparatus 100 is positioned in use where access to other portions of decorative lighting apparatus 100 may be hindered or difficult. Motion switch 118 may also optionally include weather-proofing elements to protect motion switch 118, as well as other internal components of decorative lighting apparatus 100, from the exterior environment, including weather. For example, weather-proofing elements for motion switch 118 may include rubber, plastic, and/or other sealing elements to make it substantially waterproof, dirt-proof, and the like.

As noted above, motion switch 118 may control any visual and/or optical effect that can be produced by decorative lighting apparatus 100, such as a motion, modulation, or articulation of the light produced by light source(s) 106. For example, motion switch 118 may turn on and off the various visual and/or optical effects produced by decorative lighting apparatus 100, such as pulsing light sources 106, activating the colored lights being produced by light sources 106 in a pattern (e.g., first red, then green, then red, the together, etc.), moving the light being emitted and projected by decorative lighting apparatus 100. Moving the light being emitted and projected by decorative lighting apparatus 100 may be achieved by moving a reflective element within decorative lighting apparatus 100 so that the light projected by decorative lighting apparatus 100 on a target surface moves.

Figure 6:
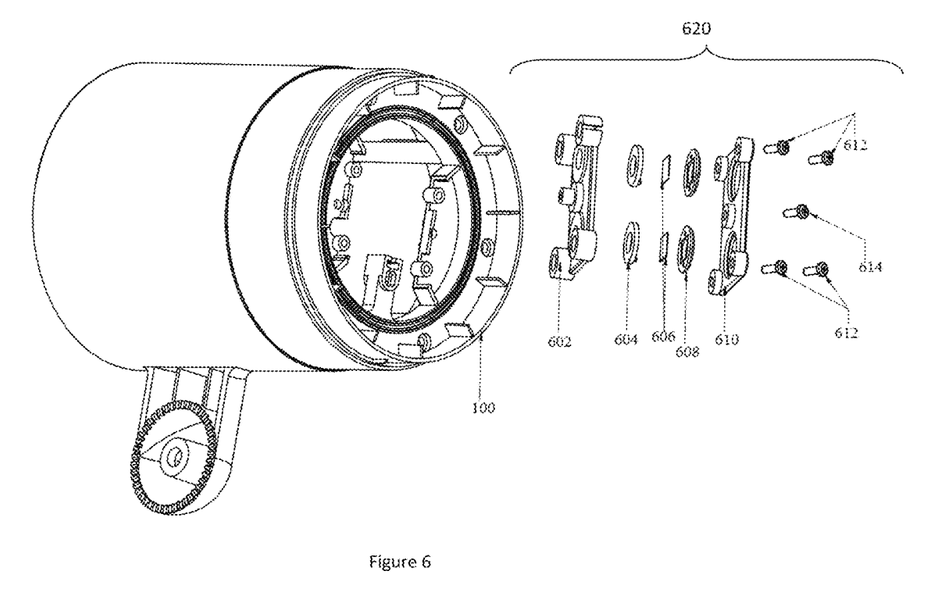
FIG. 6 is an exploded view of an exemplary attenuation assembly according to one embodiment of the present invention.

FIG. 6 shows an exploded view of attenuator assembly 620 of decorative lighting apparatus 100 according to certain embodiments of the present invention. As shown in FIG. 6, attenuator assembly 620 includes attenuator lower housing 602, attenuator lower base 604, attenuators 606, attenuator upper base 608, attenuator upper housing 610, and fastening elements 612 and 614. Attenuator assembly 620 positions and secures attenuator 606 in the path of the light generated by light source 106 within body 102 of decorative lighting apparatus 100. Although FIG. 6 shows decorative lighting apparatus 100 only having two attenuators 606, decorative lighting apparatus 100 preferably includes an attenuator 606 for each light source 106 included in decorative lighting apparatus 100. Thus, if decorative lighting apparatus 100 were to include five light sources 106, decorative lighting apparatus 100 would preferably include five attenuators 606. Accordingly, embodiments of the present invention contemplate modifications to attenuator assembly 620 shown in FIG. 6 to accommodate any number of attenuators 606 that may be required in view of the number of light sources 106 employed by decorative lighting apparatus 100.

According to certain embodiments of the present invention, attenuators 606 can include any type of attenuating device to be placed in the path of the light generated by light sources 106. For example, attenuator 606 can include an opening/slit or a lens to diffract and/or scatter the light produced by light source 106. Alternatively, attenuators can include an optical attenuator (e.g., fixed, variable, etc.) to reduce the power of the light produced by light sources 106. Attenuators may be necessary where light sources 106 include lasers since lasers can be dangerous and can cause damage to eyesight. Although attenuator 606 is shown to be substantially square, attenuator 606 may be any shape, such as a circle, rectangle, triangle, hexagon, octagon, or any other shape.

As shown in FIG. 6, attenuator assembly 620 includes attenuator 606 disposed between upper and lower attenuator bases 604 and 608, which is disposed between upper and lower attenuator housings 602 and 610. Upper and lower attenuator bases 604 and 608 can include complementary designs and, when coupled together, preferably form a recess shaped and configured to receive attenuator 606 such that attenuator 606 is held in a substantially fixed position. Similarly, upper and lower attenuator housings 602 and 610 can include complementary designs and preferably include a recess, when coupled together, shaped and configured to receive the assembled upper and lower attenuator bases 604 and 608 such that the assembled upper and lower attenuator bases 604 and 608 are held in a substantially fixed position. The assembled attenuator assembly 620 can be held together and mounted within housing 112 by fastening devices 612 and 614. Although fastening devices 612 and 614 are shown as screws, fastening devices 612 and 614 may include any type of mechanism that can hold attenuator assembly 620 together and/or mount attenuator assembly 620 within housing 112 of body 102, such as snap-fits, adhesives, glue, screws, bolts, Velcro, hinges or any other fastening mechanisms. Accordingly, fastening devices 612 and 614 can secure attenuator assembly 620 together and position attenuator 606 in the path of the light generated by light sources 106.

According to certain embodiments of the present invention, decorative lighting apparatus 100 may include an anti-theft device. For example, decorative lighting apparatus 100 may include a theft device that includes proximity sensor disposed within decorative lighting apparatus 100 and a base unit that may be disposed in a secure location, such as inside a home. The anti-theft device may be configured that the proximity sensor disposed within decorative lighting apparatus 100 and the base unit must remain within a certain distance to each other for decorative lighting apparatus 100 to be operable. If the distance between the proximity sensor with decorative lighting apparatus 100 and the base unit exceeds a certain threshold distance (e.g., if decorative lighting apparatus 100 had been placed outside and is stolen and removed from the premises), anti-theft device preferably renders decorative lighting apparatus 100 inoperable. The anti-theft device may include other features, such as a key-pad to enable utilizing a security code, a motion sensor with an alert mechanism (e.g., audio, visual, etc.) when decorative lighting apparatus 100 is moved without knowledge to the owner, etc.

According to yet another embodiment of the present invention, decorative lighting apparatus 100 may include a solar power module configured to power decorative lighting apparatus 100. For example, decorative lighting apparatus 100 may include solar panels, such as photovoltaic panels, which can convert solar energy into electricity and store the electricity in a storage medium, such as batteries or capacitors, which can then be used to power decorative lighting apparatus 100. This can remove the need for decorative lighting apparatus 100 to be connected to an external power supply by, for example, having to run extension cords to the location of decorative lighting apparatus 100. Accordingly, this can enable decorative lighting apparatus 100 to be more easily placed and positioned in virtually any location.

The embodiments and examples shown above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of the disclosure. For a better understanding of the disclosure, reference should be had to the accompanying drawings and descriptive matter in which there is illustrated exemplary embodiments of the present invention.

What is claimed is:

1. An attenuation assembly for a decorative lighting apparatus, the attenuation assembly comprising:
   an attenuator;
   a first housing being configured to be coupled to a second housing; and
   a first base being configured to be coupled to a second base,
   the first housing being coupled to the second housing to form a recess designed and dimensioned to receive and hold the attenuator in a substantially fixed position, and
   the first base being coupled to the second base to form-a further recess designed and dimensioned to receive and hold the coupled first housing and second housing in a substantially fixed position.

2. The attenuation assembly of claim 1, further comprising at least one fastening element configured to couple the first base to the second base.

3. The attenuation assembly of claim 2, wherein the at least one fastening element is further configured to couple the attenuation assembly to the decorative lighting apparatus.

4. The attenuation assembly of claim 2, wherein the at least one fastening element includes screws.

5. The attenuation assembly of claim 1, wherein the attenuator includes a plurality of attenuators.

6. The attenuation assembly of claim 5, further comprising a plurality of first housings configured to be coupled to a plurality of second housings.

7. The attenuation assembly of claim 6, wherein the further recess includes a plurality of further recesses, each further recess designed and dimensioned to receive and hold one of the plurality of first housings and second housings, which have been coupled, in a substantially fixed position.

8. The attenuation assembly of claim 1, wherein the attenuation assembly is configured to position the attenuator in a path of a light generated by the decorative lighting apparatus.

9. A decorative lighting apparatus comprising:
   at least one light source;
   an attenuation assembly including:
     an attenuator;
     a first housing being configured to be coupled to a second housing; and
     a first base being configured to be coupled to a second base,
     the first housing being coupled to the second housing to form a recess designed and dimensioned to receive and hold the attenuator in a substantially fixed position, and
     the first base being coupled to the second base to form a further recess designed and dimensioned to receive and hold the coupled first housing and second housing in a substantially fixed position.

10. The decorative lighting apparatus of claim 9, wherein the at least one light source includes a laser.

11. The decorative lighting apparatus of claim 9, wherein the attenuator assembly further includes at least one fastening element configured to couple the first base to the second base.

12. The decorative lighting apparatus of claim 11, wherein the at least one fastening element is further configured to couple the attenuation assembly to the decorative lighting apparatus.

13. The decorative lighting apparatus of claim 9, wherein the attenuation assembly is configured to position the attenuator in a path of a light generated by the decorative lighting apparatus.

14. A laser light decorative lighting apparatus, comprising
   a first laser light source providing a first light having a first color;
   a second laser light source providing a second light having a second color,
   a rocker switch including a first position corresponding to the first light source and the second light source being in an off condition, a second position corresponding to the first light source being in an on condition and the second light source being in an off condition, and a third position corresponding to the first light source and the second light source being in an on condition;
   a visual indicator including a first colored portion corresponding to the first color and corresponding to the second position of the rocker switch and a second colored portion corresponding to the first color and the second color and corresponding to the third position of the rocker switch; and
   an attenuation assembly including:
     an attenuator;
     a first housing being configured to be coupled to a second housing; and
     a first base being configured to be coupled to a second base,
     the first housing being coupled to the second housing to form a recess designed and dimensioned to receive and hold the attenuator in a substantially fixed position, and
     the first base being coupled to the second base to form a further recess designed and dimensioned to receive and hold the coupled first housing and second housing in a substantially fixed position, such that at least one of the first light and the second light travels through the attenuator.

15. The laser light decorative lighting apparatus of claim 14, further comprising a motion switch for controlling a movement of the first light and second light projected by the first laser light source and the second laser light source.

16. The laser light decorative lighting apparatus of claim 14, further comprising a light sensor configured to measure a level ambient of light and control the first laser light source and the second laser light source based on the measured level of ambient light.

* * * * *